Sept. 23, 1952  H. P. THROWER  2,611,183
PIPE MARKING DEVICE

Filed April 24, 1951  2 SHEETS—SHEET 1

Inventor: H. P. Thrower
By [signature]
His Attorney

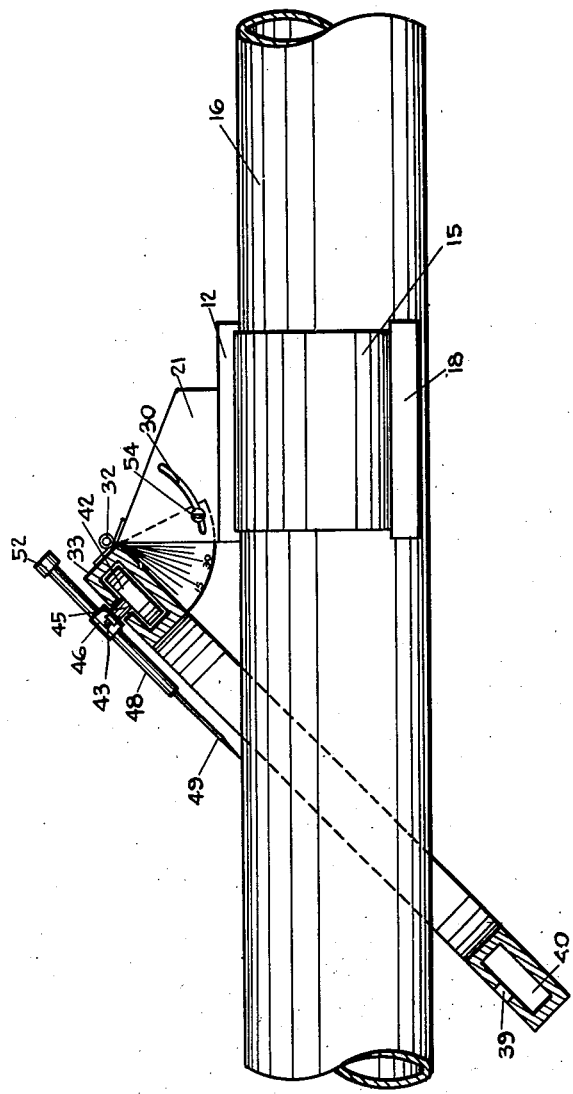

Patented Sept. 23, 1952

2,611,183

UNITED STATES PATENT OFFICE 2,611,183

PIPE MARKING DEVICE

Harold P. Thrower, Odessa, Tex., assignor to Shell Development Company, Emeryville, Calif., a corporation of Delaware Application April 24, 1951, Serial No. 222,566

2 Claims. (Cl. 33—21)

1

This invention relates to pipe line equipment and pertains more particularly to an apparatus for marking a line around a pipe at any angle at which it is desired to subsequently cut the pipe.

During the installation of piping in industrial plants, such for example as oil refineries, oil fields and pipe lines, it is often necessary to cut pipe at various angles in order to fabricate pipe elbows of a desired angle. Since a pipe has a cylindrical surface, it is generally difficult to mark and cut a pipe accurately at any angle other than normal to the axis of the pipe. Additionally, much time is lost and material wasted in recutting pipe which was inaccurately marked and cut.

It is an object of the present invention to provide a pipe-marking apparatus of simple and sturdy design adapted to be mounted on a pipe, said apparatus being provided with an instrument for tracing a line around the pipe at substantially any predetermined angle to the axis of said pipe.

Another object of this invention is to provide a pipe marking apparatus adapted to encircle pipes of varying diameters for tracing a line therearound, at any desired angle.

These and other objects of this invention will be understood from the following description of the invention as shown in the accompanying drawing, wherein:

Figure 2 is a view, partly in cross section, of a slightly modified embodiment of the present invention illustrated as being mounted on a section of pipe.

Figure 1:
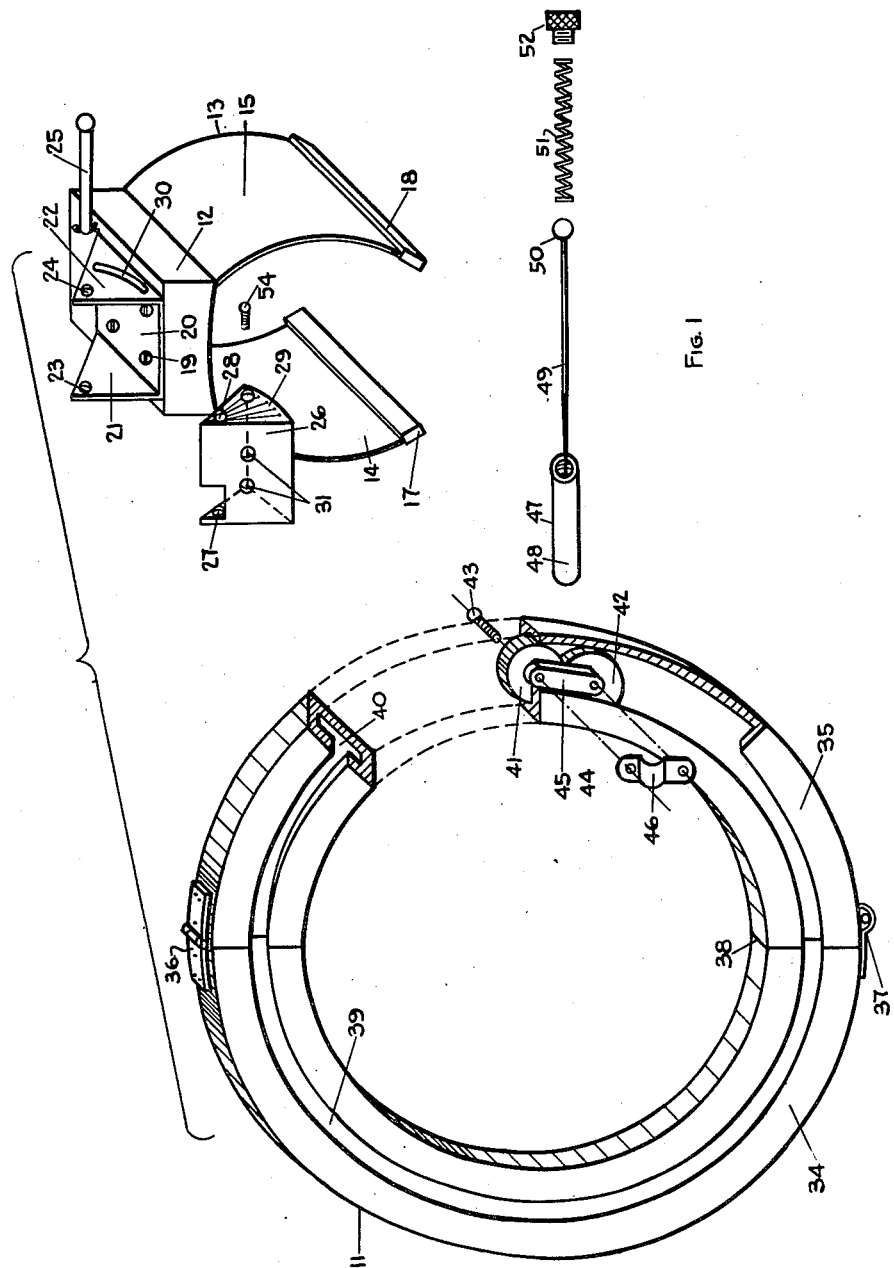
Figure 1 is an exploded isometric view, partly in cross section, of one embodiment of the present pipe-marking apparatus.

Briefly, the present pipe-marking apparatus comprises a base member provided with means for clamping it to the outside of a pipe. A ring member, having a carriage and scribing device mounted thereon, is hinged to the base member so that said ring member may be tilted at any angle with regard to the base as the ring member encircles a pipe.

As shown in the exploded view in Figure 1, the pipe-marking apparatus comprises a ring member or housing ring 11 which is adapted to be secured in a hinged manner to a base member 12 which may be clamped to a pipe by any suitable pipe-clamping means. The base member 12 is fixedly secured to the center of a length of spring steel 13 which has been pre-formed to a circular shape of a diameter less than that of the pipe on which the apparatus is to be mounted. Thus, a pair of spring-loaded arms 14 and 15 are formed,

2 one on either side of the base member 12, for gripping the outer surface of a pipe 16 as shown in Figure 2. If desired, the ends of the arms 14 and 15 may be provided with rubber friction tips 17 and 18 in order that the apparatus may be mounted on the pipe more securely. It is realized that the clamping arms 14 and 15 may be spring-loaded in any other method known to the art. Also, any well known pipe-clamping means may be substituted for arms 14 and 15.

Rigidly affixed to the top of the body member 12 by bolts 19 is a hinge plate 20 having a pair of vertically-extending side plates 21 and 22 which are provided with holes 23 and 24 near the top thereof which are adapted to receive therein a hinge pin or shaft 25. Swingingly mountable on the hinge pin 25 is a wedge-shaped hinge member 26 having holes 27 and 28 through the upper portion thereof to receive pin 25. One end 29 of the hinged wedge 26 is provided with a scale for indicating angular displacement of the wedge 26 about the pin 25. One side-plate 22 is provided with an arcuate groove 30. The calibrated wedge 26 is provided also with a lock screw 54 adapted to slide in said groove 30 and to be tightened against plate 22 for anchoring the wedge 26 in a pre-determined fixed position. The wedge 26 may be also equipped with bolt holes 31 adapted to receive bolts (not shown) for bolting the wedge 26 flush with the back of the ring member 11, as shown in Figure 2. In Figure 2 a slightly different type of hinge 32 is shown which is positioned at the top of the wedge 26 and fixedly secured, as by welding, to the top 33 of the ring member 11 and to the side plates 21 and 22.

The ring member 11 is of split construction forming two semi-circular portions 34 and 35 which are secured together at one end by a hinge 36 and preferably at the other end by suitable latch means, such as a friction latch 37. If desired, the adjoining faces of the two ring portions 34 and 35 may be beveled, as at 38. The closed ring member 11 has an inside diameter greater than the outside diameter of the pipe 16 (Figure 2) whereby the ring member may be tilted at varying angles or installed on pipes of varying diameters. The entire ring member 11 is equipped with an annular track 39 which is cut or formed on one surface thereof.

Preferably, the ring member 11 is of hollow construction with the track 39 being in the form of an annular slot through one side wall of the ring member 11 in communication with an inner annular slot 40 within the ring member 11, the two slots being arranged at right angles to each other substantially in a T-shape, as shown in the drawing. A carriage, comprising one or more wheels 41 and 42 rotatably secured by pins 43 and 44 to a connecting or guide bar 45, is mounted in the hollow ring member 11 so that the guide bar 45 moves in the slot or track 39, while the wheels move in slot 40. A suitable holder 46 adapted to hold a marking device 47 is in turn bolted to the guide bar 45 for movement therewith.

The shape and size of the holder 46 is determined by the marking device 47 being employed. While the marking device 47 may consist of any suitable stylus, pen, pencil, or the like, in the embodiment of Figure 1 the marking device comprises a barrel 48 in which a sharp-pointed marking pin 49 is mounted so as to extend therefrom toward the center of the annular ring member. One end of the pin 49 is pointed while the other end is enlarged or has a head 50 attached thereto against which a spring 51 may act. The spring 51 is locked in the barrel 48 in any suitable manner, as by a screw-threaded cap 52.

To mount the present marking apparatus on a pipe, the friction latch 37 of the ring member 11 is unlatched and the hinged portions 34 and 35 of the ring member 11 are opened and placed around the pipe 16. Elements 34 and 35 are then closed again to the position shown in Figure 1. At the same time the spring-loaded clamping arms 14 and 15 are forced open and then allowed to spring to a closed position around and against the pipe after the base member 12 has been positioned on the top of the pipe 16 as shown in Figure 2. Since the inside diameter of the ring member 11 is substantially larger than the outside diameter of the pipe 16 to be marked, the ring member 11 may be tilted about its hinge 32 (Figure 2) to the predetermined angle at which the pipe 16 is to be marked and cut.

The angle at which the ring member 11 is set is measured on the scale 29. When the ring member is at the proper angle, lock screw 54 is tightened to anchor the ring member 11 at that fixed angle. With the apparatus positioned at the desired angle the wheeled carriage and guide bar 41, 42 and 45 together with the marking pin 49 are manually moved around the circular track 39 and annular opening 40 of the ring member. As the spring-loaded marking pin is drawn around the pipe 16, it is forced from the barrel 48 by the spring 51 to maintain contact with the surface of the pipe at all times, thereby tracing a line on the pipe along which it is to be cut. Preferably, the marking pin is mounted on the movable carriage so that it points at all times to the axis of the pipe 16.

After the pipe 16 has been marked for cutting, the present pipe-marking apparatus is removed by opening latch 37 and the ring member 11, while at the same time opening the clamping arms 14 and 15.

I claim as my invention:

1. A pipe-marking apparatus adapted to be removably secured on a pipe for tracing a line around the pipe at a predetermined angle, said apparatus comprising a base member adapted to be seated on said pipe, spring-loaded clamp means affixed to said base member for securing said base member to said pipe, a hollow hinged split ring member having an annular bore therein, said ring member being of a size sufficient to encircle said pipe, hinge means securing a portion of one side of said ring member to said base member in tiltable relationship therewith, said hollow ring member having a circular guide slot in a side wall thereof, said slot being in communication with the bore within said ring member, wheeled carriage means of a length less than the radius of said ring member carried within said ring member and movable therearound in the bore and guide slot thereof, marking means affixed to said carriage means and movable therewith, said marking means extending towards the center of said ring member to contact the pipe encircled thereby.

2. A pipe-marking apparatus adapted to be removably secured on a pipe for tracing a line around the pipe at a predetermined angle, said apparatus comprising a base member adapted to be seated on said pipe, spring-loaded clamp means affixed to said base member for securing said base member to said pipe, a hollow hinged split ring member having an annular bore therein, said ring member being of a size sufficient to encircle said pipe, hinge means securing a portion of one side of said ring member to said base member in tiltable relationship therewith, said hollow ring member having a circumferential guide slot in communication with the bore of said ring member through a side wall thereof, a short two-wheeled carriage carried within said ring member and movable therearound in the bore thereof, bar means affixed to one side of said wheeled carriage and extending through the guide slot in said ring member, marking means affixed to said bar means and movable therewith, said marking means comprising a tubular holder open at one end, a pointed stylus carried within said holder and extending through the open end thereof, and spring means within said holder for urging the stylus therefrom, whereby the pointed end of the stylus extends towards the center of said ring member to contact the pipe encircled thereby.

HAROLD P. THROWER.

REFERENCES CITED

The following references are of record in the file of this patent:

UNITED STATES PATENTS

| Number | Name | Date |
|---|---|---|
| 1,000,399 | Gessert et al. | Aug. 15, 1911 |
| 1,692,925 | Brown | Nov. 27, 1928 |
| 1,698,154 | Day | Jan. 8, 1929 |
| 1,775,667 | Bucknam | Sept. 16, 1930 |
| 1,832,255 | Springstead | Nov. 17, 1931 |
| 2,086,764 | Brown | July 13, 1937 |
| 2,108,743 | Brady | Feb. 15, 1938 |
| 2,459,823 | Lebedeff | Jan. 25, 1949 |
| 2,509,698 | Rudisell | May 30, 1950 |
| 2,567,049 | Belluche | Sept. 4, 1951 |

FOREIGN PATENTS

| Number | Country | Date |
|---|---|---|
| 738,404 | France | Oct. 17, 1932 |